United States Patent
Ichimura et al.

(12)

(10) Patent No.: US 7,182,039 B2
(45) Date of Patent: Feb. 27, 2007

(54) STRIKER MECHANISM FOR BELL UNIT

(75) Inventors: Kyoji Ichimura, Tokyo (JP); Motohisa Ishiwa, Tokyo (JP); Kazuharu Seki, Tokyo (JP)

(73) Assignee: Tokyo Bell Seisakusho Co., Ltd., Tokyo (JP)

( * ) Notice: Subject to any disclaimer, the term of this patent is extended or adjusted under 35 U.S.C. 154(b) by 1 day.

(21) Appl. No.: 11/079,827

(22) Filed: Mar. 14, 2005

(65) Prior Publication Data
US 2006/0096520 A1    May 11, 2006

(30) Foreign Application Priority Data
Nov. 8, 2004  (JP) .............................. 2004-323571

(51) Int. Cl.
G10K 1/072  (2006.01)

(52) U.S. Cl. ...................................... 116/167; 116/166

(58) Field of Classification Search ........ 116/155–167, 116/148–149; 84/406
See application file for complete search history.

(56) References Cited

U.S. PATENT DOCUMENTS

| 1,798,444 | A | * | 3/1931 | Wood | .......................... | 116/158 |
| 2,880,693 | A | * | 4/1959 | Rea | ............................. | 116/155 |
| 5,307,756 | A | * | 5/1994 | Ichimura et al. | ............. | 116/166 |
| 6,450,115 | B1 | * | 9/2002 | Ichimura et al. | ............. | 116/152 |

FOREIGN PATENT DOCUMENTS

| DE | 3249312 A1 | * | 6/1984 |
| EP | 008841 | * | 9/1979 |
| EP | 486085 A1 | * | 11/1991 |
| JP | 61-185690 | | 11/1986 |
| JP | 2520590 | | 10/1996 |

* cited by examiner

*Primary Examiner*—Diego Gutierrez
*Assistant Examiner*—Tania Courson
(74) *Attorney, Agent, or Firm*—Flynn, Thiel, Boutell & Tanis, P.C.

(57) ABSTRACT

A striker mechanism 21 which clangs a bell 21 is made up of a support member 31 which projects radially outward of the bell, a striker 41 pivotably mounted on the support member so as to be rockable in a direction toward and away from the outer peripheral surface of the bell, and a leaf spring member 41 for maintaining the striker at an intermediate position as viewed in the rocking direction which is by a given distance spaced from the bell. The striker is formed at its one end with an impactor 42 which impacts the bell and an operator 43 which operates the striker for rocking motion and is formed at the other end with a spring abutment 46 against which the leaf spring member resiliently abuts, an intermediate portion between the opposite ends being pivotably mounted on the support member so as to be rockable. The striker 41 is pivotably mounted on projections 33 so as to be rockable, and accordingly, if an excessive magnitude of force is applied to the striker 41, a displacement of its orientation can be prevented.

7 Claims, 2 Drawing Sheets

STRIKER MECHANISM FOR BELL UNIT

FIELD OF THE INVENTION

The present invention relates to a bell unit which is preferred for use on a bicycle or tricycle, and more particularly, to an improvement in a striker mechanism for a bell unit.

DESCRIPTION OF THE PRIOR ART

A bell unit is well known in the art which comprises a bell mounting member which is mounted on a handle of a bicycle, a bell mounted on the bell mounting member and a striker mechanism mounted on the bell mounting member for clanging the bell.

The present applicant has previously proposed a striker mechanism which comprises a support member projecting radially outward from the bell and a striker mounted on the support member through a coiled spring so as to be rockable toward and away from the outer peripheral surface of the bell (Registered Utility Model No. 2,520,590).

The striker mechanism arranged as mentioned above offers an advantage that it can be manufactured inexpensively because it can be constructed with the support member, the coiled spring and the striker, but the use of the coiled spring causes a disadvantage that the orientation of the striker may be angularly displaced as much as 45°, for example, if an excessive magnitude of force is applied thereto, presenting an inconvenience in use or presenting an awkward appearance. In addition, if the coiled spring is stressed more than is required, it may be worn out to be of no use.

SUMMARY OF THE INVENTION

In view of the foregoing, the invention intends to provide a striker mechanism for a bell unit which can be constructed inexpensively and which can prevent the orientation of a striker from being changed to disable its use.

Specifically, in a bell unit including a bell mounting member mounted on a handle of a bicycle, a bell mounted on the bell mounting member and a striker mechanism mounted on the bell mounting member to clang the bell, the present invention is characterized in that the striking mechanism comprises a support member projecting radially outward from the bell, a striker pivotably mounted on the support member so as to be rockable in a direction toward and away from the outer peripheral surface of the bell, and a leaf spring member for maintaining the striker at an intermediate position as viewed in the rocking direction which is spaced by a given distance from the bell.

According to the present invention, the striker, which is maintained by the leaf spring member at an intermediate position as viewed in the rocking direction, can be rocked in a direction away from the bell against the resilience of the leaf spring member. If the finger is now released, the striker is rocked toward the bell under the resilience of the leaf spring member to impact it, thus clanging the bell.

Since the striker mechanism can be constructed with the support member, the leaf spring member and the striker, it can be manufactured inexpensively as in the prior art.

Since the striker is pivotably mounted on the support member so as to be rockable, the occurrence of a change in the orientation of the striker to disable its use as experienced when the coiled spring is used as in the prior art is prevented, allowing it to be used in a stable manner over a prolonged period of time.

Above and other objects, features and advantages of the invention will become apparent from the following description of an embodiment thereof with reference to the drawings.

DETAILED DESCRIPTION OF THE EMBODIMENT

Figure 1:
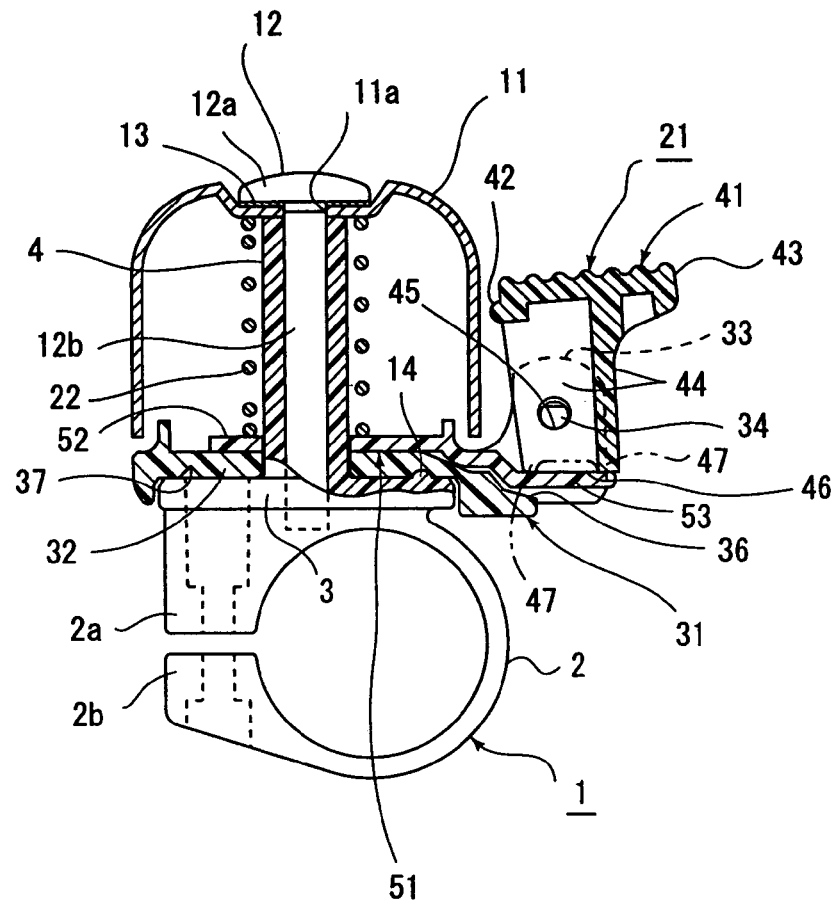
FIG. 1 is a view, partly in section, of an embodiment of the invention.

An embodiment of the invention shown in the drawings will now be described. In FIG. 1, a bell unit is adapted to be mounted by a bell mounting member 1 on a handle of a bicycle or a tricycle, not shown.

The bell mounting member 1 is formed of a synthetic resin material and includes a grip 2 which is disposed in surrounding relationship with a handle and connected thereto, a disc 3 disposed on top of the grip 2, and a hollow support shaft 4 extending from a central portion of the disc 3 in a direction which is approximately radially outward of the handle, all in an integral manner. The grip 2 and the support shaft 4 may be separate from each other and connected together.

The grip 2 of the bell mounting member 1 is disposed in surrounding relationship with the handle, but is cut at a portion to leave the opposite ends in abutment against each other. While not shown, a nut embedded in one end 2a is threadably engaged by a bolt which is passed through the other end 2b, and by clamping the bolt, the grip 2 can be secured to the handle.

A metal bell 11 is placed on the top end of the support shaft 4, and is integrally connected and secured to the support shaft 4 by using a fastener 12 and a washer 13. The fastener 12 includes a disc-shaped head 12a and a shank 12b extending downward from the central portion of the lower surface of the head. The shank 20b is passed through a through-opening 11a formed centrally in the washer 13 and the bell 11 and disposed as a press fit into the hollow support shaft 4, whereby the bell 11 is secured on the top end of the support shaft 4 by the head 12a of the fastener 12 and the washer 13.

A striker mechanism 21 is disposed on the disc 3 of the bell mounting member 1. A coiled spring 22 disposed around the outer periphery of the support shaft 4 extends between the striker mechanism 21 and the internal surface of the central portion of the bell 11, thus holding the striker mechanism 21 on the disc 3 of the bell mounting member 1.

Figure 2:
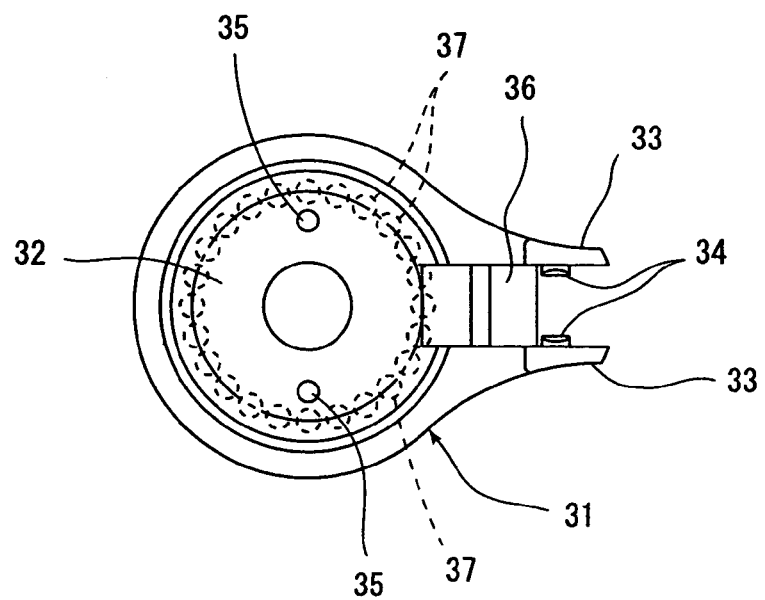
FIG. 2 is a plan view of a support member 31.

The striker mechanism 21 includes a support member 31 which is formed of a synthetic resin material and which is rotatable about the support shaft 4, and the support member 31 is placed on top of the disc 3. A portion of the support member 31 which is placed on top of the disc 3 defines a disc portion 32, and as shown in FIG. 2, the outer periphery of the disc portion 32 is provided with a pair of projections 33, 33 which project radially outward of the bell 11 from a position located below the opening of the bell 11.

The pair of projections 33, 33 rise upward while maintaining a parallel relationship between them at a position external of the bell 11, and the opposing surfaces of both projections 33, 33 are provided with ears 34 which pivotally mount a striker 41 (FIG. 1) which forms the striker mechanism 21 in a rockable manner.

As shown in FIG. 1, the striker 41 is formed of a synthetic resin material in a generally substantially rectangular configuration. At one end or the end toward the bell 11, the upper surface is formed with an impactor 42 which impacts against the bell 11, while at the other end, the upper surface is formed with an operator 43 which operates the striker 41 for rocking motion. The entire upper surface is corrugated in order to facilitate the operation of the striker 41 for rocking motion.

The striker 41 has a sidewall 44 which extends downward from the upper surface, and the sidewall 44 is open only toward the bell 11 so as to be channel-shaped in horizontal section. Opposing sidewalls 44 are formed with engaging holes 45, which are engaged by the ears 34 formed on the projections 33, 33, whereby the striker 41 is pivotally mounted on the projections 33, 33 so as to be rockable in a direction toward and away from the outer peripheral surface of the bell 11.

The tip of each ear 34 is obliquely notched in its upper portion to facilitate inserting the striker 41 between both projections 33, 33 from above to cause each ear 34 to engage with the engaging hole 45.

The sidewall 44 of the striker 41 has a lower end, which is formed to be generally planar and which defines a spring abutment 46. A leaf spring member 51 which also forms the striker mechanism 21 is disposed to resiliently abut against the planar spring abutment 46 from below, thereby maintaining the striker 41 at an intermediate position as viewed in a rocking direction which is spaced by a given distance from the bell 11.

Figure 3:
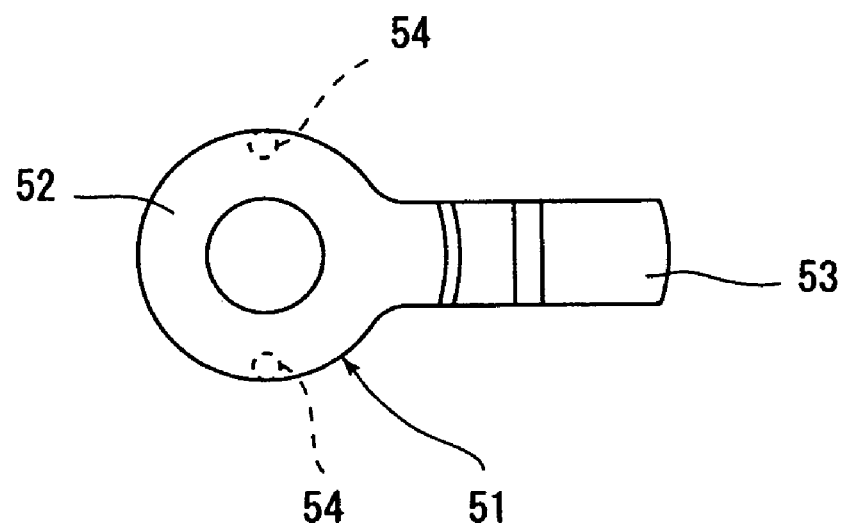
FIG. 3 is a plan view of a leaf spring member.
Figure 4:
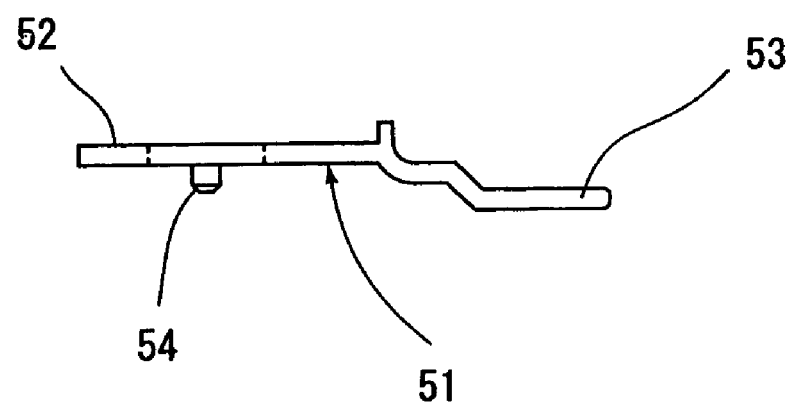
FIG. 4 is a side elevation of FIG. 3.

The leaf spring member 51 is formed of a synthetic resin material and is rotatable about the support shaft 4, and includes a disc portion 52 which is placed on the disc portion 32 of the support member 31, and a spring portion 53 which projects radially outward of the bell 11 from the outer periphery of the disc portion 52, as shown in FIGS. 3 and 4.

On its lower surface, the disc portion 52 of the leaf spring member 51 is formed with protuberances 54 extending downward, which are provided at two locations in the embodiment shown, and each protuberance 54 engages with the engaging hole 35 formed in the disc portion 32 of the support member 31, thus integrally connecting them together.

On the other hand, the spring portion 53 extends between the pair of projections 33, 33 formed on the support member 31 to a location below the striker 41 to abut against the spring abutment 46 of the striker 41 resiliently.

The support member 31 includes a portion 36 which connects between the pair of projections 33, 33 and which is located below the spring portion 53 of the leaf spring member 51, and when the striker 41 is rocked in a direction away from the bell 11 (clockwise direction as viewed in FIG. 1) over a permissible stroke, the portion 36 abuts against the spring portion 53 which is resiliently deformed as the striker is rocked, functioning as a stop which prevents a further rocking motion.

As mentioned above, the support member 31 and the leaf spring member 51 are integrally connected together by the engagement between the engaging holes 35 and the protuberances 54, and when both members are integrally rotated about the support shaft 4, the striker 41 can be rotated around the bell 11, allowing the position of the striker 41 relative to the handle to be freely adjusted.

In order to position the striker 41 rotationally, a lower surface of the support member 31 or a surface thereof which is in contact with the disc 3 is formed with a number of recesses 37 which are spaced apart at a given interval on a circle which is concentric with the axis of rotation of the support member 24 while the upper surface of the disc 3 is formed with dowels 14 positioned to be superimposed with the concentric circle to be engaged with either one of the recesses 37.

With the described arrangement, when the striker 41 is to be oriented in a required direction, the projections 33 on the support member 31 may be gripped to rotate it about the support shaft 4. At this time, the dowel 14 formed on the disc 3 moves from recess 37 to recess 37 while flexing the coiled spring 22 to keep the support member 31 and the leaf spring member 51 slightly lifted above the disc 3.

When the striker 41 is oriented in a desired direction, the dowels 14 are engaged with selected recesses 37, whereby the support member 31 is positioned in the direction of rotation, allowing the striker 41 to be maintained as oriented in a desired direction.

Under this condition, if an operator depresses the operator 43 of the striker 41 downward by his finger, the striker 41 is rocked clockwise as viewed in FIG. 1 about the ears 34 in a direction away from the bell 11. Since the spring abutment 46 of the striker 41 is planar, the clockwise rotation of the striker 41 causes the spring portion 53 of the leaf spring member 51 to be resiliently deformed downward.

If the operator 43 is now released, the striker 41 rotates counter-clockwise under the resilience of the spring portion 53, whereby the inertial force thereof causes the impactor 42 of the striker 41 to impact the bell 11 to clang it.

After clanging the bell 11, the striker 41 will be maintained in its original intermediate position since the planar spring abutment 46 becomes superimposed on the planar spring portion 53.

In the embodiment described above, the striker 41 is pivotably mounted to be rockable by being held between the pair of ears 33, and accordingly, if an excessive magnitude of force is applied to the striker 41, it cannot be displaced in orientation or worn out to be of no use as experienced with the prior art arrangement which uses a coiled spring.

In this embodiment, the striker 41 is formed with the impactor 42 and the operator 43 at one end thereof while the other end is formed with the spring abutment 46, allowing the engaging holes 45 which are located intermediate the opposite ends to be pivotably mounted in a rockable manner by the ears 34 on the projections 33 of the support member 31, whereby the magnitude of the force which is used when depressing the operator 43 of the striker 41 downward by the finger of the operator can be freely chosen.

If a striker is integrally provided on a leaf spring member which is formed of a synthetic resin material, the resilience of the leaf spring member formed of a synthetic resin material is less than the resilience of the leaf spring member formed of a metal, whereby the striker will be operated hard and an angle of the rocking motion will be reduced, resulting in a degraded feeling of use. On the other hand, if the thickness of the leaf spring member is reduced to improve a feeling of operation, it would be easily broken and would be susceptible to degradation by ultra-violet rays.

By contrast, in the present embodiment, an intermediate portion of the striker 41 located between one end (impactor 42 and operator 43) and the other end (spring abutment 46) is pivotably mounted in a rockable manner, and accordingly, if a leaf spring member were formed of a synthetic resin material and of an increased thickness, a soft feeling to operate and a greater angle of rocking motion can be obtained by adjusting the location of the pivot relative to the opposite ends, or more specifically, by bringing the pivot nearer the other end (spring abutment 46).

The present embodiment assures an ease of assembly. Specifically, when the bell unit is assembled, the support shaft 4 of the bell mounting member 1 is passed through the support member 31 and the disc portion 32 of the support member 31 is placed on top of the disc 3 of the bell mounting member 1. The disc portion 52 of the leaf spring member 51 is disposed in overlapping relationship with the disc portion 32 of the support member 31, and the protuberances 54 of the leaf spring member 51 engage with the engaging holes 35 in the support member 31 to connect both members integrally.

The shank 12b of the fastener 12 is passed through the through-opening 11a formed centrally in the washer 13 and the bell 11, and the coiled spring 22 is disposed around the support shaft 4, and then the shank 12b is disposed as a press fit into the support shaft 4, thus securing the bell 11 on the top end of the support shaft 4.

Finally the striker 41 is inserted between both projections 33, 33 on the support member 31, and the ears 34 provided on both projections 33, 33 are engaged with engaging holes 45 formed in the sidewall 44 of the striker 41. This completes the assembly.

The order in which the parts are assembled is not limited to the sequence mentioned above. The sequence of assembling can be changed as by attaching the striker 41 between the projections 33, 33 of the support member 31 before the assembly, and it is to be noted that every assembling operation takes place in a snap-on manner, allowing an efficient assembling operation.

In the embodiment, the spring abutment 46 is formed to be planar, but it is not limited thereto. For example, as indicated in phantom lines in FIG. 1, a pair of projections 47 which are spaced apart radially of the bell 11 may together constitute a spring abutment, and the leaf spring member 51 may be disposed so as to abut both projections simultaneously in a resilient manner to maintain the striker 41 at the intermediate position.

Also, in the embodiment, the stop 36 abuts against the leaf spring member 51 to prevent a rocking motion of the striker 41 beyond a required amount, but it may be formed on the internal surface of the projections 33, 33 to abut against the striker 41 directly.

In addition, in the embodiment, the striker 41 is arranged to be rotatable around the bell 11, but it is not a limitation. Where there is no necessity to rotate the striker 41 around the bell 11, the bell mounting member 1 and the support member 31 may be integrally constructed.

While the invention has been described above in connection with an embodiment thereof, it should be understood that a number of changes, substitutions and modifications therein are possible without departing from the spirit and the scope of the invention defined by the appended claims.

The invention claimed is:

1. A bell unit comprising a bell mounting member for mounting the bell unit on a handle of a cycle, a bell mounted on the bell mounting member and a striker mechanism mounted on the bell mounting member for ringing the bell, said striker mechanism comprising a support member having a pair of parallel projections which project radially outward of the bell, a striker disposed between the projections and pivotably mounted on the projections so as to be rockable in a direction toward and away from an outer peripheral surface of the bell and a leaf spring member that resiliently abuts against the striker and maintains the striker at an intermediate position, as viewed in a rocking direction, at a given distance from the bell.

2. The bell unit of claim 1, wherein the striker has an impactor for impacting with the bell and an operator for operating the striker for a rocking motion formed at one end of the striker and a spring abutment formed at the other end of the striker, the striker being pivotably mounted on the projections of the support member at an intermediate position between the ends of the striker so as to be rockable, the leaf spring member resiliently abutting against the spring abutment to maintain the striker at said intermediate position at a given distance from the bell.

3. The bell unit according to claim 2, in which the spring abutment is formed to be planar and the leaf spring member resiliently buts against the planar spring abutment to maintain the striker at the intermediate position.

4. The bell unit according to claim 2, in which the spring abutment is formed with a pair of projections which are spaced apart radially of the bell and the leaf spring member resiliently buts against the projections to maintain the striker at the intermediate position.

5. The bell unit according to claim 1, in which the support member is formed with a stop which prevents the striker from being rocked beyond a permissible stroke in a direction away from the bell.

6. The bell unit according to claim 5, in which the stop prevents the striker from being rocked beyond the permissible stroke in a direction away from the bell by abutting against the leaf spring member, which undergoes an elastic deformation as the striker is rocked beyond a permissible stroke in a direction away from the bell.

7. The bell unit according to claim 1, in which the support member is rotatably mounted on the bell mounting member, the rotation permitting the striker to be rotated around the bell.

* * * * *